(12) United States Patent
Janeke

(10) Patent No.: US 8,215,589 B2
(45) Date of Patent: Jul. 10, 2012

(54) REVERSIBLE SPACE PLANE

(76) Inventor: Charl E. Janeke, Agoura Hills, CA (US)

( * ) Notice: Subject to any disclaimer, the term of this patent is extended or adjusted under 35 U.S.C. 154(b) by 1169 days.

(21) Appl. No.: 12/154,185

(22) Filed: May 19, 2008

(65) Prior Publication Data

US 2008/0217481 A1 Sep. 11, 2008

Related U.S. Application Data

(63) Continuation-in-part of application No. 12/072,317, filed on Feb. 25, 2008, now Pat. No. 7,690,601, which is a continuation of application No. 11/040,170, filed on Jan. 21, 2005, now Pat. No. 7,344,111.

(60) Provisional application No. 60/538,417, filed on Jan. 23, 2004.

(51) Int. Cl.
*B64C 1/00* (2006.01)
*B64D 33/02* (2006.01)

(52) U.S. Cl. ............ 244/158.9; 244/172.2; 244/53 B

(58) Field of Classification Search ............ 244/158.1, 244/159.1, 159.3, 158.9, 171.8, 160, 171.7, 244/172.2, 53 B; 62/7
See application file for complete search history.

(56) References Cited

U.S. PATENT DOCUMENTS

| | | | | |
|---|---|---|---|---|
| 3,098,445 A * | 7/1963 | Jackson | ............... | 244/3.28 |
| 3,295,789 A * | 1/1967 | Hill | ............... | 244/159.3 |
| 3,576,298 A * | 4/1971 | Barnett et al. | ............... | 244/159.3 |
| 3,602,460 A * | 8/1971 | Whittley et al. | ............... | 244/12.4 |
| 3,903,801 A * | 9/1975 | Senoski | ............... | 102/348 |
| 4,271,665 A * | 6/1981 | Mandrin | ............... | 60/39.182 |
| 4,754,601 A * | 7/1988 | Minovitch | ............... | 60/204 |
| 4,896,847 A * | 1/1990 | Gertsch | ............... | 244/159.1 |
| 5,115,996 A * | 5/1992 | Moller | ............... | 244/12.5 |
| 5,452,866 A * | 9/1995 | Bulman | ............... | 244/117 A |
| 5,853,143 A * | 12/1998 | Bradley et al. | ............... | 244/3.21 |
| 5,873,549 A * | 2/1999 | Lane et al. | ............... | 244/158.9 |
| 6,119,985 A * | 9/2000 | Clapp et al. | ............... | 244/171.4 |
| 6,608,463 B1 * | 8/2003 | Kelly et al. | ............... | 320/101 |
| 6,918,244 B2 * | 7/2005 | Dickau | ............... | 60/229 |
| 6,921,596 B2 * | 7/2005 | Kelly et al. | ............... | 429/425 |
| 7,344,111 B2 * | 3/2008 | Janeke | ............... | 244/158.9 |
| 7,690,601 B2 * | 4/2010 | Janeke | ............... | 244/158.9 |
| 2003/0085319 A1 * | 5/2003 | Wagner et al. | ............... | 244/12.3 |
| 2004/0026572 A1 * | 2/2004 | Burton | ............... | 244/172 |
| 2004/0188568 A1 * | 9/2004 | Gayrard et al. | ............... | 244/163 |
| 2008/0147295 A1 * | 6/2008 | Sivasubramaniam et al. | ............... | 701/103 |

OTHER PUBLICATIONS

"Apollo Command/Service Module" Wikipedia, the Free Encyclopedia, May 16, 2011 http://en.wikipedia.org/wiki/Apollo_Command/Service_Module.*

* cited by examiner

*Primary Examiner* — Timothy D Collins
*Assistant Examiner* — Joseph W Sanderson
(74) *Attorney, Agent, or Firm* — J. Curtis Edmonson

(57) ABSTRACT

A reversible aerospace plane includes an air intake at a first end of the aerospace plane, at least one heat exchanger disposed in the aerospace plane and an engine at a second end of the aerospace plane, wherein the aerospace plane is configured to accelerate in a first direction and configured to glide and land in a second direction, wherein the second direction is substantially in a reverse direction from the first direction.

5 Claims, 8 Drawing Sheets

REVERSIBLE SPACE PLANE

This is a Continuation-In-Part of U.S. application Ser. No. 12/072,317 filed Feb. 25, 2008 now U.S. Pat. No. 7,690,601, which is a continuation of U.S. application Ser. No. 11,040,170 filed Jan. 21, 2005 now U.S. Pat. No. 7,344,111, which claimed priority from U.S. Provisional Application No. 60/538,417 filed on Jan. 23, 2004.

BACKGROUND OF THE INVENTION

1. Field of the Invention

The present application relates generally to space planes. More particularly, the invention concerns a novel reversible space plane.

2. Discussion of the Prior Art

The loss of the space shuttle Columbia in 2003 highlights a need for a safer reusable single-stage-to-orbit ("SSTO"). The Columbia included a payload during re-entry, which was not typical for such re-entries. In addition to the mass of the payload, problems with the tiled heat shield led to the catastrophic loss of the Columbia. Due to the shuttle's relatively small footprint, structural weight, and rapid decent into the atmosphere, it dissipates most of the kinetic energy of orbital velocity in the denser atmosphere, relying exclusively on the heat shield to remain intact. Because of the need to clear the atmosphere relatively quickly and reliance on boosters, the NASA space shuttle evolved into a daunting behemoth that is very costly to assemble and launch.

U.S. Pat. No. 5,191,761 ("the '761 patent"), owned by the applicant for the present invention, discloses an air breathing aerospace engine. That patent is incorporated by reference in its entirety. The engine includes a frontal core that houses an oxygen liquefaction system that captures ambient air and liquefies and separates the oxygen. The oxygen may then be used in the rocket engine.

U.S. Pat. No. 6,213,431 ("the '431 patent") owned by the applicant for the present invention, discloses an aerospike engine. That patent is incorporated by reference in its entirety. An aerospike engine may have a tapered body with a slanted or curved reaction plane. A fuel injector directs fuel down the reaction plane. The combustion of the fuel on the reaction plane creates a propulsive force across the reaction plane.

What is needed, therefore, is a reversible re-usable SSTO vehicle that may be expediently launched to service the rapidly expanding space enterprise. A reduction in cost as well as an improvement in payload capacity are also desires of this growing industry.

SUMMARY OF INVENTION

In one aspect, the invention relates to a reversible aerospace plane that includes an air intake at a first end of the aerospace plane, at least one heat exchanger disposed in the aerospace plane, and an engine at a second end of the aerospace plane, wherein the aerospace plane is configured to accelerate in a first direction and configured to glide and land in a second direction, wherein the second direction is substantially in a reverse direction from the first direction.

In another aspect, the invention relates to a method of flying an aerospace plane that includes accelerating to an orbital velocity in a first direction, re-orienting the aerospace plane, and re-entering an atmosphere in a second direction, wherein the second direction is substantially in an opposite direction from the first direction.

Other aspects and advantages of the invention will be apparent from the following description and the appended claims.

DESCRIPTION OF THE INVENTION

An aerospace plane in accordance with one or more embodiments of the invention may be a reversible aerospace plane. The aerospace plane may include an air liquefaction system that enables the aerospace plane to travel at hypersonic velocities in the atmosphere with reduced drag. When operated in the reverse direction, the aerospace plane may exhibit a larger drag so that the kinetic energy from an orbital velocity may be dissipated at a higher altitude and over a longer time period than conventional vehicles.

Figure 1:
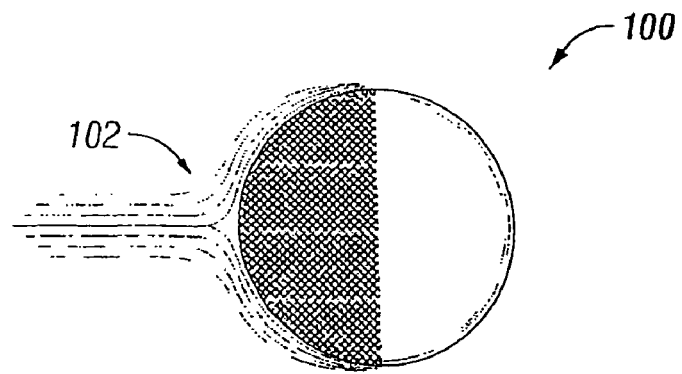
FIG. 1 shows a view of an ideal sphere moving at supersonic velocity.

FIG. 1 shows the ideal situation of a sphere 100 moving at hypersonic velocity through the atmosphere. The surface 102 of the front half of the sphere 100 is an ideal condenser that will condense the incident air to a liquid upon contact with the surface 102. In this ideal model, instead of creating a shockwave in the atmosphere, the sphere 100 condenses the air, thereby creating a partial vacuum in front of the sphere 100. The effect of this condensation of air is to reduce the drag experienced by the sphere 100 to zero. The sphere can move at an unlimited speed through the atmosphere, without creating drag. This principle may be applied to the present invention to enable hypersonic velocity at previously unattainable speeds.

Figure 2:
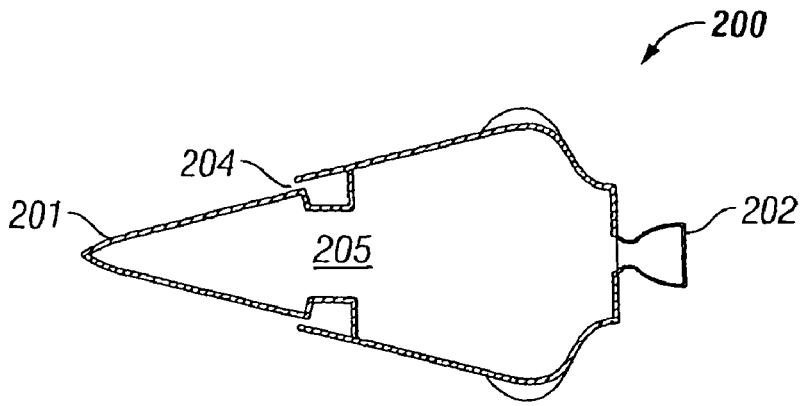
FIG. 2 shows a cross section of an embodiment of an aerospace plane in accordance with one embodiment of the invention.

FIG. 2 shows a cross section of an aerospace plane 200 in accordance with one embodiment of the invention. The aerospace plane includes a nose cone 201 at the front and a bell rocket engine 202 at the rear. An air intake 204 allows air to flow into the aerospace plane 200 as it moves through the atmosphere. The air enters a heat exchanger portion 205 of the aerospace plane 200.

Figure 3:
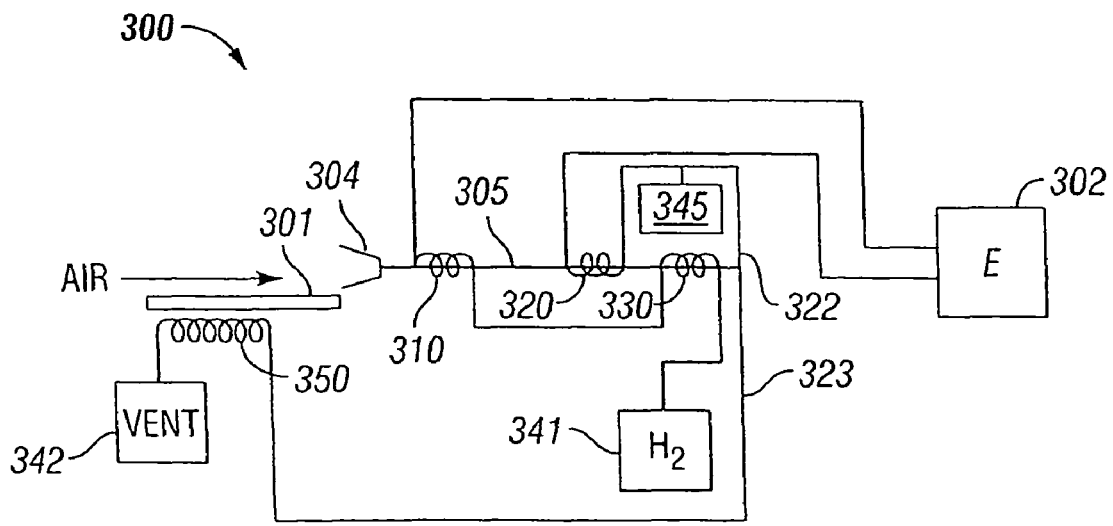
FIG. 3 shows a schematic of a cooling/condensing system in accordance with one embodiment of the invention.

FIG. 3 is a schematic of a heat exchanger system 300 in accordance with one embodiment of the invention. Reference may be made to FIG. 2 as well, to show the respective location of the components in this particular embodiment.

Air that is incident on the nose cone 301 (201 in FIG. 2) is cooled by a cooling fluid in the nose cone 301. For a conventional aircraft, the air that is incident upon the front of the aircraft as it moves through the atmosphere is compressed adiabatically. That is, the compression occurs without substantial heat transfer. As a result, the incident air increases in temperature. By cooling the air that is incident on the nose cone 301, the compression may be an isothermal compression. That is, heat is absorbed from the incident air so that it is compressed without a significant increase in temperature.

Generally, isothermal compression requires less energy that a similar adiabatic compression. Because of the lower energy requirement, there is less drag on the aerospace plane (200 in FIG. 2) as it travels through the atmosphere.

It is noted, however, that in practice, the incident air may experience an increase in temperature. For example, incident air, which may have a temperature close to 0 degrees F. at altitude, may be heated to over 1,500.degrees F. because of drag for a conventional aircraft traveling at about Mach 5. Precooling the air, as will be described, may result in the incident air being heated to only 500.degree.F. Thus, the compression process with pre-cooling more closely approaches the isothermal ideal.

The precooling of the air before it flows through the intake (204 in FIG. 2) may be done using nitrogen gas (or liquid) separated from the incident air, as will be described. A heat exchanger 350 in the nose cone 301 may be used to precool the air.

Upon flowing into the air intake 304 (204 in FIG. 2), the incident air enters a heat exchanger/condenser portion (205 in FIG. 2) of the aerospace plane. In the embodiment shown in FIG. 3, the incident air is cooled and condensed in three stages, 310, 320, 330. More or less than three stages may be used without departing from the scope of the present invention.

An aerospace plane in accordance with the invention may include a hydrogen tank 341 for storing an amount of hydrogen that is necessary for propulsion. The hydrogen it typically stored in liquid form, and therefore, must be kept below −423.degree.F., the boiling point of hydrogen. This liquid hydrogen must be evaporated before it may be used as a propellant in the engine 302. To evaporate the hydrogen, it is convenient to flow the hydrogen through heat exchangers (e.g., 310, 330 in FIG. 3) so that cooling an condensing of the incident air may be accomplished at the same time.

As shown in FIG. 3, hydrogen from the hydrogen storage tank 341 is pumped through the third stage heat exchanger 330, where the low temperature and the heat of vaporization are used to condense the incident. As will be discussed later, in some embodiments, only the oxygen from the incident air is liquefied.

Hydrogen has a specific heat of 3.425 BTU/lb-.degree.F. and a heat of vaporization of 191.7 BTU/lb. Oxygen, on the other hand, has a specific heat of 0.219 BTU/lb-.degree.F. and a heat of vaporization of 91.7 BTU/lb. The greater values for hydrogen provide an advantage in cooling and condensing the oxygen.

Following the third stage, the hydrogen, typically in gaseous form, flows to the first stage 310, where it is used to continue the cooling process of the incident air following precooling from the nose cone 301. The hydrogen may then be pumped to the engine for use as a propellant or fuel.

The incident air, following the precooling at the nose cone 301, flows through the air intake 304 (204 in FIG. 2) and into the first stage heat exchanger 310. In the first stage 310, the air cooled, and the energy from the air is used to heat the hydrogen to an appropriate temperature for combustion in the engine.

The cooling of the incident air continues in the second stage heat exchanger 320. In the embodiment shown in FIG. 3, the coolant in the second stage 320 is liquid oxygen, which may be from an oxygen tank 345 or it may be the liquefied oxygen that results from the condensation of the oxygen in the air in the third stage 330.

In the third stage 330, at least a portion of the oxygen in the air is liquefied by giving up energy to the liquid hydrogen coolant in the third stage 330. Air is mostly comprised of oxygen (about 20%) and nitrogen (about 80%). The boiling point of oxygen (i.e., the temperature, at 1 ATM, below which oxygen is a liquid) is −180.degree.F. and the boiling point of nitrogen is −230.degree.F. This difference enables the condensation of some or all of the oxygen in the incident air, without liquefying any of the nitrogen in the incident air.

It is noted that the invention does not preclude the liquefaction of nitrogen in the incident air. However, there may be certain advantages to liquefying only the oxygen in the incident air. For example, cooling potential needed to liquefy the nitrogen may be saved and used for other purposes, such as tanking additional oxygen. Also, liquefying the nitrogen in the incident air would require larger and more massive heat exchangers, which may adversely affect the available payload. In addition, the cooled nitrogen gas may be used for cooling purposes, as will be described.

Following the third stage 330, the incident air may be separated into an oxygen component and a nitrogen component. The nitrogen component, shown at 323, may flow to the precooler heat exchanger 350 in the nose cone 301 of the aerospace plane. The oxygen component may flow to the second stage heat exchanger 320, where in may be evaporated into gas for use in the engine 302. Additionally, the liquid oxygen from the incident air may be pumped to a storage tank 345 for storage and later use—for example, it may stored for use in space, where there is no atmosphere to provide incident air.

Liquefying oxygen from the atmosphere during flight presents numerous advantages. First, collecting and liquefying oxygen during flight greatly reduces the amount of tanked liquid oxygen that must be stored on-board before lift off. A non-air breathing rocket must carry all of the oxygen that will be used during the entire flight. This represents a significant mass. The hydrogen combustion reaction with oxygen requires 2 moles of hydrogen for every mole of oxygen ($H_2O$ has two hydrogen atoms for every atom of oxygen). But because oxygen is 16 times heavier than hydrogen, the required oxygen has 8 times the mass of the required hydrogen. In an air-breathing rocket, the oxygen may be distilled from the atmosphere, thus saving a substantial amount of mass.

Appendix A to this application includes two tables showing the amount of pre-launch mass, including fuel and oxygen, that is required to propel one pound of payload into orbit. The fuel in this case is hydrogen. The two cases are for a non-air breathing aerospace plane and an air breathing aerospace plane. Starting with an orbital velocity of 25,000 ft./sec, the chart shows calculations working backwards to zero velocity. In each step, the difference in kinetic energy (DKe) is used to determine the differential masses of the fuel (DH2, DO2) required to achieve the kinetic energy differential. The masses are then cumulatively added to the mass (MM) of the rocket.

The upper chart shows that for a non-air breathing rocket, 9.116 pounds of takeoff weight are required to get 1.000 pounds of payload to an orbital velocity of 25,000 ft./sec. The lower chart represents an air breathing rocket. At velocities below 14,000 ft./sec, which represent flight in the atmosphere, the differential in oxygen mass (DO2) is zero. This is because the oxygen may be condensed from the atmosphere, as described above. The lower chart shows that only 5.183 pounds of takeoff weight is needed to propel 1.000 pound of payload to an orbital velocity of 25,000 ft./sec. For embodiments where a fraction of the liquefied oxygen is tanked for later use, the required takeoff weight may be even lower.

Appendix B shows similar charts for a rocket fueled with methane. A non-air breathing rocket may require 23.941 pounds of takeoff weight to propel 1.000 pound of payload to an orbital velocity of 25,000 ft./sec, where an air breathing rocket may require only 10.572 pounds of takeoff weight.

It is further noted that a hydrogen slush may be tanked instead of simple liquid hydrogen. A slush includes partially frozen hydrogen that is still able to be pumped. This would increase the cooling capacity of an aerospace plane by as much as 13%, resulting in a payload increase of as much as 10%.

Figure 4A:
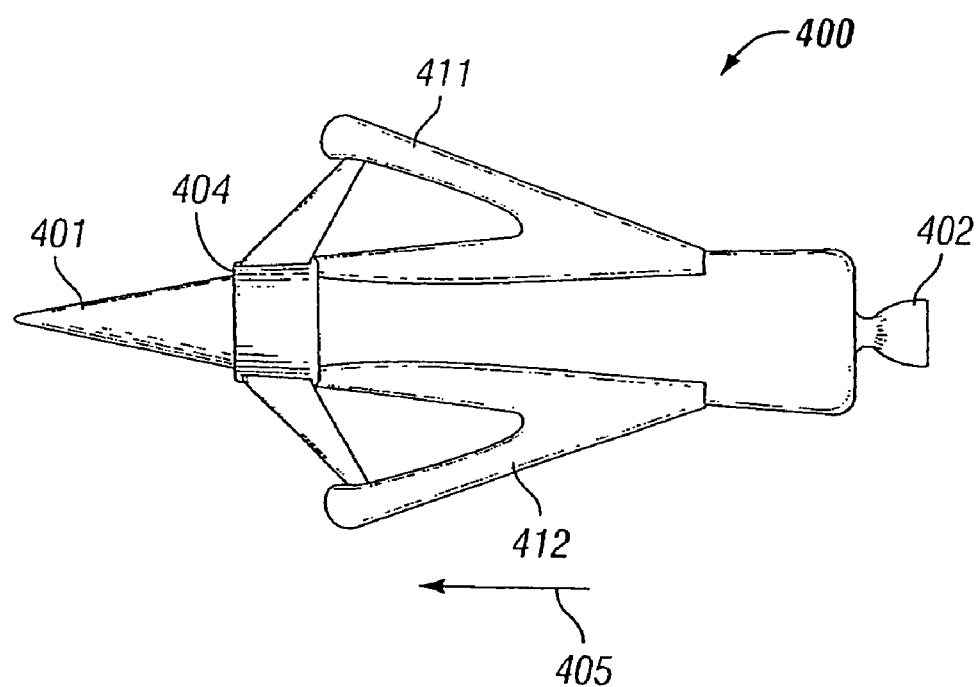
FIG. 4A shows one embodiment of an aerospace plane in accordance with one embodiment of the invention.

FIG. 4A shows a reversible aerospace plane 400 in accordance with one embodiment of the invention. A reversible aerospace plane is one that is capable of takeoff/acceleration in one direction, but deceleration/re-entry and landing in a reverse direction.

The aerospace plane 400 includes a nose cone 401, and air intake 404, and a conventional bell rocket engine 402. In addition, the body of the aerospace plane 400 includes two wings 411, 412. During an acceleration/takeoff mode, the aerospace plane 400 may be propelled by the engine 402 in the direction shown by the arrow 405. In this direction, the wings 411, 412 form a "hyper foil," which is used to mean that they present a small profile to the incident air, and the drag is minimized. The wings 411, 412 may form an air foil so that they will provide lift during atmospheric flight. In addition, lift may be generated by the angle of attack of the aerospace plane 400.

The nose cone 401 and the associated heat exchangers (e.g., 350 in FIG. 3) may be constructed of a light and relatively inexpensive material so that the nose cone 401 may be jettisoned from the aerospace plane 400 before re-entry. During re-entry, the aerospace plane 400 may fly in an opposite direction, and the nose cone would no longer be needed. The constraints of heat exchanger design may require that the nose cone 401 be formed in such a way that it would not be able to withstand the forces and heat of re-entry. In addition, a nose cone may present a hazard or obstruction during landing. Thus, it may be jettisoned from the aerospace plane 400, as will be explained.

The aerospace plane 400 in FIG. 4A may be used with a piggy-back arrangement to gain an initial altitude and airspeed. For example, a larger plane may be used to carry the aerospace plane 400 from the ground to an altitude of 30,000 ft.-50,000 ft. From this point, the bell engine 402 may be engaged to provide the thrust to achieve orbit.

Figure 4B:
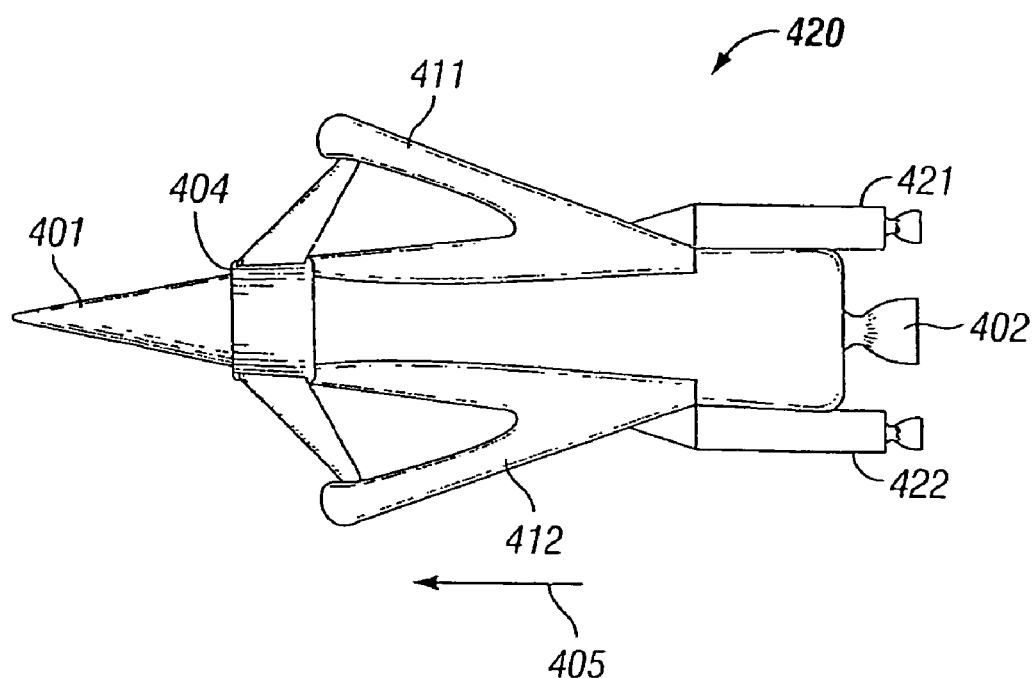
FIG. 4B shows one embodiment of an aerospace plane with boosters in accordance with one embodiment of the invention.

FIG. 4B shows an aerospace plane 420 with solid rocket boosters 421, 422, similar to the boosters that have been used with the NASA space shuttle orbiter. The boosters 421, 422 may be used to provide low altitude thrust for the aerospace plane 420. The boosters 421, 422 may be jettisoned once they have been spent.

Figure 4C:
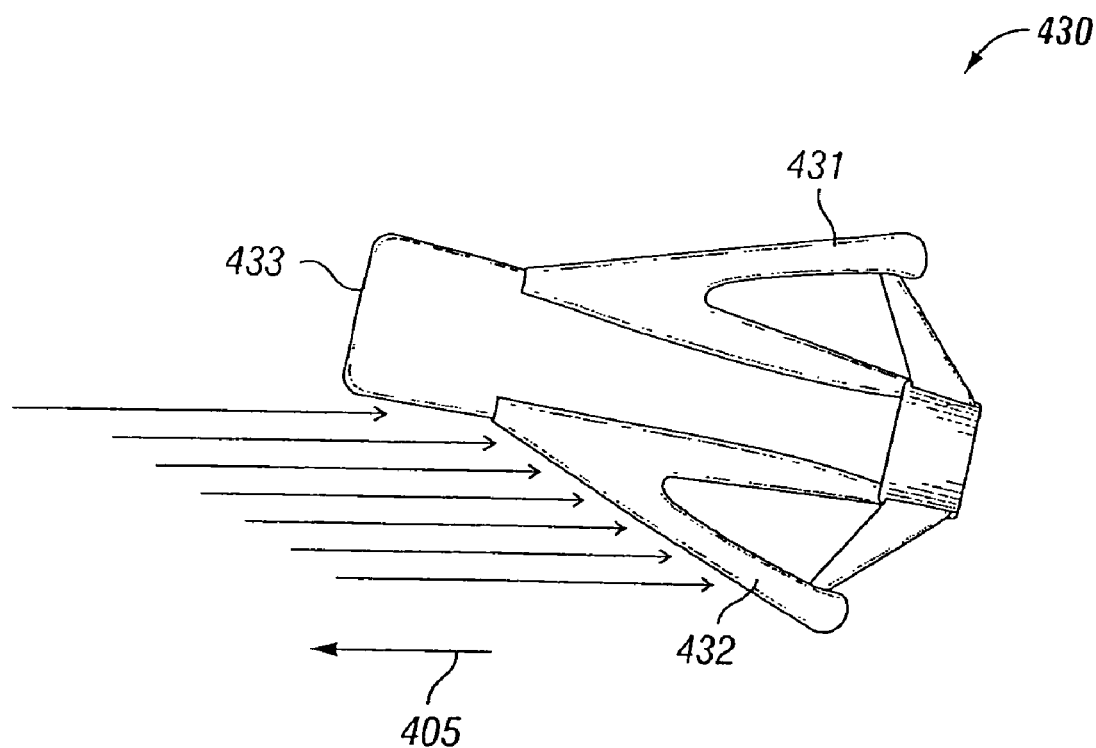
FIG. 4C shows one embodiment of an aerospace plane during re-entry, in accordance with one embodiment of the invention.

FIG. 4C shows one embodiment of a reversible aerospace plane 430 during a re-entry phase. The aerospace plane 430 is flying in a reverse orientation from the aerospace planes 400, (420 shown in FIGS. 4A and 4B). This may be accomplished by simply using orientation thrusters to rotate the aerospace plane 430 180.degree. while in orbit and before re-entry begins. In FIG. 4C, the nose cone (401 in FIG. 4A) has been jettisoned. In addition, at the forward section of the aerospace plane 430 in this mode, the engine (402 in FIG. 4A) has been likewise jettisoned for aerodynamic and control purposes.

The aerospace plane 430 and its wings 431, 432 are formed so that in the reverse direction, they create a "para foil", that is, they are formed to have rounded edges that present a large profile and create more drag that when the aerospace plane 430 flies in the takeoff direction (e.g., the direction shown in FIG. 4A). As shown in FIG. 4C, the aerospace plane 430 may be pitched upwardly so as to create even more drag.

The drag on the aerospace plane 430 in the reverse direction enables the aerospace plane 430 to dissipate a large amount of kinetic energy in the upper atmosphere, where atmospheric density it low enough that the aerospace plane 430 will not generate temperatures that require sophisticated heat shielding.

For example, the NASA space shuttles will generally re-enter the dense atmosphere at very high speeds. The space shuttle will slow to normal air velocities within about a quarter of a full orbit. For example, when landing in Florida, it is typical for a space shuttle to begin slowing down at a position near Hawaii. The shuttle will then slow down and land in the distance between Hawaii and Florida.

An aerospace plane 430 in accordance with the invention may have a sufficient drag so that slowing down may be accomplished at a much higher altitude and over a longer distance. For example, an aerospace plane 430 may slow from orbital velocity over two complete orbits around the Earth, taking a much longer time. The additional time enables the aerospace plane 430 to dissipate the heat associated with slowing down so that sophisticated heat shielding is not required. Further, the structure and required propellant of such an aerospace plane may enable it to be substantially lighter than previous vehicles. A reduction in mass will also reduce the kinetic energy that must be dissipated during re-entry.

It is noted that an aerospace plane in accordance with the invention may be referred to a traveling in a "reverse direction." In practice, an aerospace plane may be oriented in a reverse situation, even though the vector of travel for the aerospace plane has not itself reversed. The use of "reverse direction" is meant to indicate a reverse orientation of the aerospace plane.

Figure 4D:
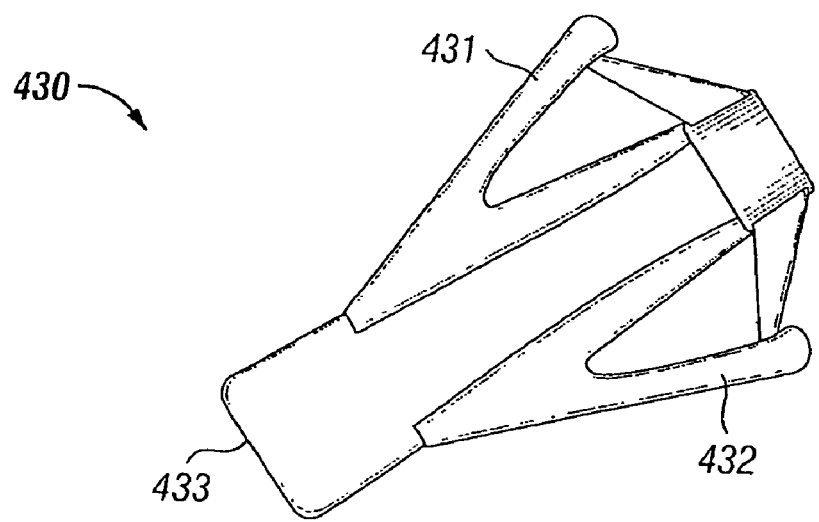
FIG. 4D shows one embodiment of an aerospace plane prepared to land in accordance with one embodiment of the invention.

FIG. 4D shows the aerospace plane 430 in a maneuvering/landing mode. The aerospace plane 430 is pitched downward for gliding, maneuvering, and landing. The wings 431, 432 may form an airfoil to generate lift that will aid in the maneuverability of the aerospace plane 430.

It is also noted that an aerospace plane in accordance with the invention may be manned or unmanned. A remotely controlled aerospace plane may be used while still gaining the advantages of the present invention. A manned aerospace plane is also within the scope of the invention. The reduced temperatures during re-entry provide a significantly safer re-entry phase than with the existing space shuttle design.

Figure 5:
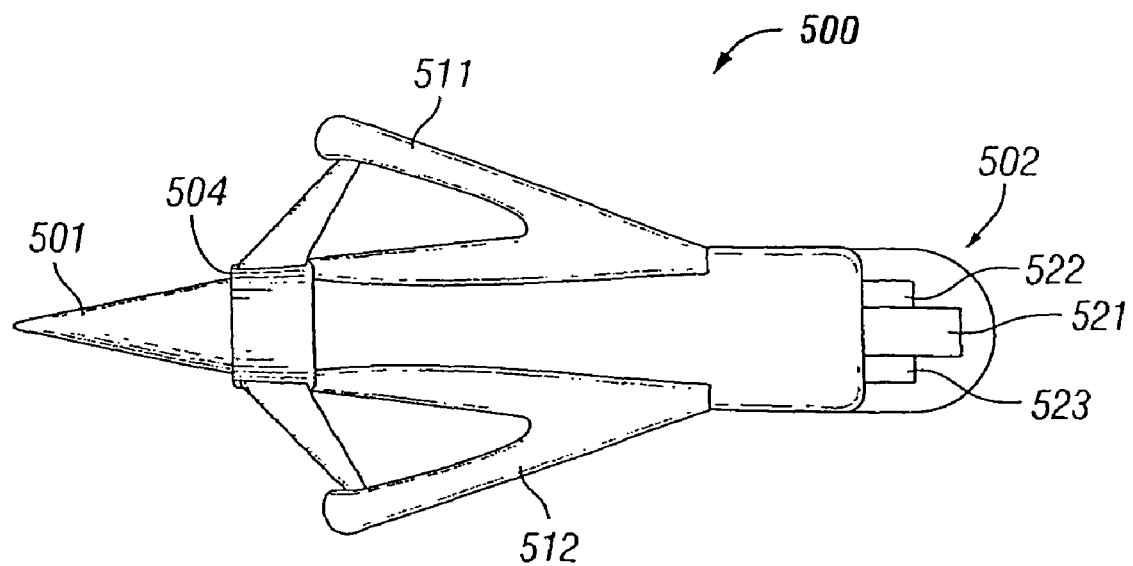
FIG. 5 shows one embodiment of an aerospace plane with an aerospike engine in accordance with one embodiment of the invention.

FIG. 5 shows another embodiment of an aerospace plane 500 in accordance with the invention. The aerospace plane 500 includes a nose cone, and air intake 504, and wings 511, 512, as the embodiment shown in FIG. 4A. The illustrated difference is that the aerospace plane 500 in FIG. 5 includes an aerospike engine 502 instead of a bell nozzle. An asonic aerospike engine is disclosed in U.S. Pat. No. 6,213,413 ("the '413 patent"), which is owned by the applicant for the present invention. That patent is incorporated by reference in its entirety.

The aerospike engine 502 shown in FIG. 5 includes a primary reaction plane 521, and two secondary reaction planes 522, 523. Any arrangement of reaction planes may be devised for an aerospike engine with out departing from the scope of the invention.

As disclosed in the '413 patent, an aerospike engine is able to operate more efficiently than a bell nozzle at a variety of altitudes. Because of this feature, an aerospace plane 500 with an aerospike 502 may be able to takeoff on a runway, using the thrust from only the aerospike engine. In this regard, an aerospace plane 500 forms a self-sufficient SSTO vehicle that may takeoff from a runway, achieve an orbital velocity, orbit the Earth, re-enter the Earth's atmosphere in a reverse direction, and land. Advantageously, such a aerospace plane 500 may not require the use of boosters or a piggy-back.

Figure 6:
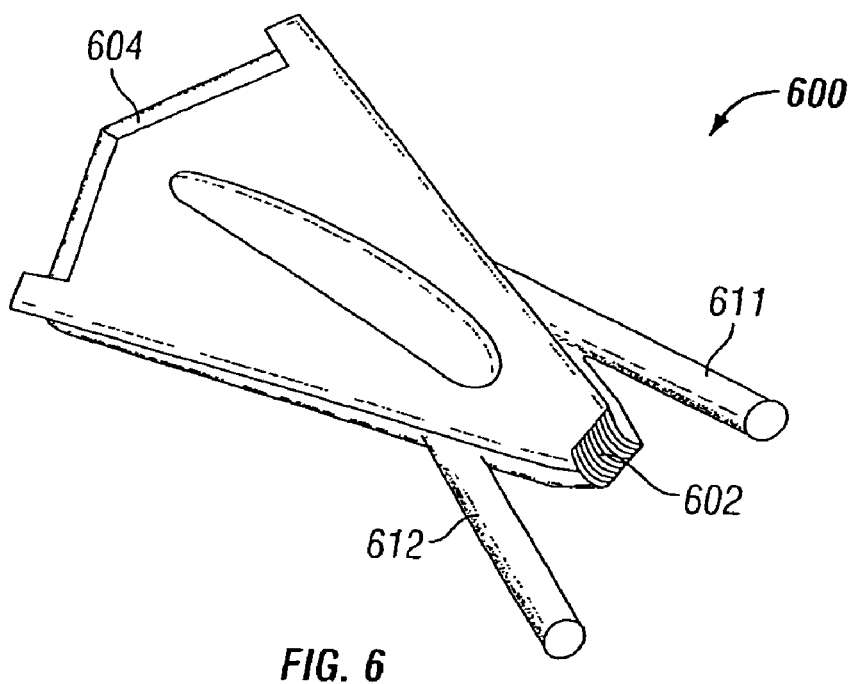
FIG. 6 shows one embodiment of an aerospace plane in accordance with one embodiment of the invention.

FIG. 6 shows another embodiment of an aerospace plane 600 in accordance with the invention. The aerospace plane 600 does not include a nose cone. Instead, the entire aerospace plane forms a wing-type structure, and there is an air intake 604 at a first end of the aerospace plane 600. An engine 602 is located at the other end, and in the embodiment shown in FIG. 6, the engine 602 is an aerospike engine. The aerospace plane 600 is shown with boosters 611, 612 that may be jettisoned. In some embodiments, and aerospace plane 600 does not include boosters. For example, an aerospace plane 600 may include an aerospike engine 602 that enables the aerospace plane 600 to takeoff, fly to orbit, and land without the need for boosters. Additionally, a piggyback may be used.

In a takeoff/acceleration mode, the aerospace plane 600 travels in a first direction 605. Incident air flows into the air intake 604, and is then cooled and condensed, thereby reducing the drag on the aerospace plane 600 at hypersonic velocity. The engine 602 may be used to propel the aerospace plane 600. Upon reaching orbital velocity, the air intake 604 may be closed.

For a re-entry/deceleration/landing mode, the aerospace plane 600 may travel in a reverse direction 606. The engine, which may be a bell nozzle in some embodiments, may be jettisoned. An aerospike engine may adapted to withstand the forces and temperatures of re-entry, or an aerospike engine may be retracted for re-entry.

Figure 7:
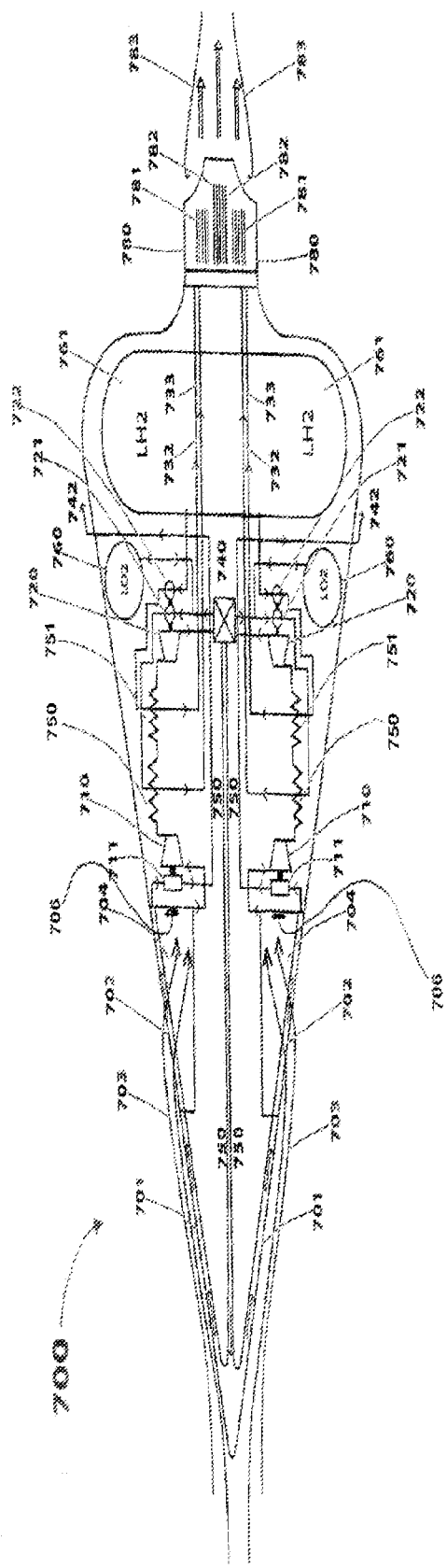
FIG. 7 shows an alternate embodiment of the aerospace plane of the invention.
Figure 7A:
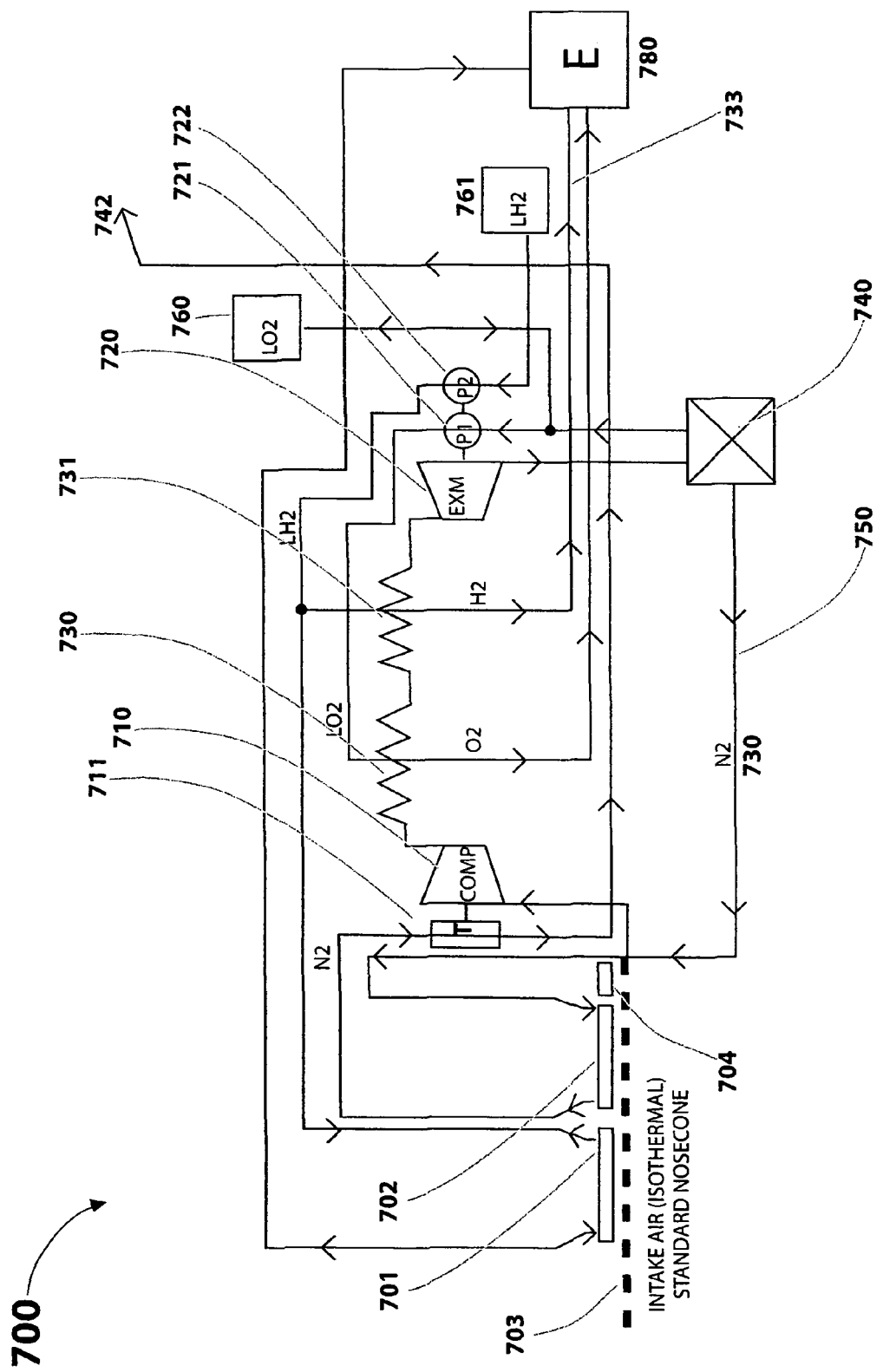
FIG. 7A is a generally schematic flow diagram illustrating the air flow through the various components of the aerospace plane illustrated in the upper portion of FIG. 7.

Turning now to FIGS. 7 and 7A of the drawings, yet another embodiment of the reversible aerospace plane of the invention is there shown in generally designated by the numeral 700. This latest embodiment of the invention is similar in many respects to the previously described embodiments, but includes several novel features not illustrated and described in connection with the embodiments of FIGS. 1 through 6.

As in the earlier described embodiments, the nosecone 701 of this latest form of aerospace plane forms the leading edge of the aerospace plane. The nosecone is configured so as to act both as a shock cone and heat exchanger and, in a manner presently to be described, is controllably chilled. Nosecone 701 may be finned, warped or dimpled to augment the heat transfer capability both inside and outside the nose cone. Alternatively, nosecone 701 may be pointed or rounded and may also be electroplated, etched, or maybe of a bi-metallic construction. As before, nose cone 701 is configured to be jettisoned before a re-entry.

The organpipe 702 of this latest form of the invention comprises a continuation of the nosecone 701 and allows the precooled ambient air 703 to enter the intake aperture 704. The organpipe tubes may be of constant diameter or they may be diverging in area and function to allow entrainment of the intake air 703 into the plenum 704, while at the same time maintaining continued isothermal compression of the intake air 703. The organpipe tubes may be finned, warped, dimpled, electroplated, etched, or they'd be of a bimetallic construction.

As in the earlier described embodiments of the invention, the intake air 103 constitutes the primary source of oxygen (propellant) driving the rocket engine thru the hypersonic regime. The intake air is isothermally compressed by super-cooling of the shock front via the nosecone and organ pipe heat exchangers 701 and 702 respectively. In the absence of a chilled/super-cooling nosecone the intake air will be adiabatically compressed via the incipient shock wave. Adiabatic compression results in searing high temperatures (and ultimate dissociation of the rarified air at high altitudes) due to the trapped heat in the shock front. In the limit of perfection, super-cooling will morph the intake air into (cool) isothermal compression. Analytically isothermal compression constitutes infinitesimal small (adiabatic) compression steps at a constant temperature. In the limit of the compression>>zero (infinitesimal small compression steps), adiabatic compression morphs isothermal compression. Super-cooling hence facilitates the desired compression regression. Because of the volumetric bulk of the rarified air at high altitudes, additional compression is essential to mitigate the size/efficacy of the liquefaction plant.

The intake plenum 704 of this latest form of the invention funnels the isothermally compressed ambient air 703 from the organpipe intake aperture to a turbo compressor 710. The intake plenum, which may be donut shaped, circular, circular compartmented or may be of a two-dimensional tubular construction, acts both as a diffuser as well as a distribution plenum in event of the use of multiple turbo compressors. The ambient air may enter the intake plenum 704 supersonically or at sonic speed in event of perfect (super) cooling of the shock front.

Compressor 710 of the invention, which is located in the manner illustrated in FIGS. 7 and 7A of the drawings, compresses the (rarified) intake air at high/hypersonic altitudes to a substantially higher pressure/density (compression ratio=10-15× ambient) so as to mitigate the volumetric extent of the sub-cooling heat exchangers and liquefaction plant. Compressor 710 is driven by turbine 711 that is, in turn, driven by superheated nitrogen 751. The compressor may be custom-designed, may be available from conventional suppliers, may be of a single or multi-stage radial construction, or it may comprise a multistage axial flow compressor.

The previously mentioned turbine 711 is here driven by the separated nitrogen 750 subsequent to being heated via the nosecone and organpipe heat exchangers 701 and 702, respectively.

Considering next the expansion turbine 720, this turbine serves dual purpose of extracting energy from the compressed intake air 703 and super cooling the intake air 703 into the cryogenic zone so as to facilitate precipitation/separation of liquid oxygen out of the ambient air. Expansion turbine 720 may comprise a radial or axial turbine all or it may comprise a conventional vane motor. The output power of the turbine can be applied to drive the propellant pumps 721 and 722. Additionally, the expansion turbine 720 can also supplement the turbo compressor 710 with a separate/external source (eg. hydrazine turbine) to drive the propellant pumps. Expansion will be limited to about 5-10 times the discharge pressure of the turbocharger compressor 710 so as to maintain dequate density to traverse the nosecone, organpipe and shroud heat exchangers 701, 702 and intake 706 respectively and additionally to provide adequate pressure to drive the turbocharger turbine 711.

In operation, pump 721 draws liquid oxygen from either or both the separator 740 and the liquid oxygen tank 760 depending upon the stage of the flight regime and upon the rate of liquid oxygen production by the liquefaction plant and separator 740. Under normal operating conditions pump 721 pumps liquid oxygen thru heat exchanger 750 where it is expanded while cooling the compressed intake air 703. The expanded oxygen is then ducted by means of a duct 732 to the aerospike engine 780.

As indicated in FIGS. 7 and 7A of the drawings, pump 722 draws liquid hydrogen from the liquid hydrogen tank 761 and then pumps the liquid hydrogen thru heat exchanger 751 where it is expanded while sub-cooling the compressed intake air 703. The expanded hydrogen is then ducted by means of duct 733 to the aerospike engine 780.

A first heat exchanger 730, which is driven by the expansion of liquid oxygen that is pumped by means of pump 721 pre-cools the compressed intake air emanating from compressor 710. As indicated in the drawings, the expanded liquid oxygen is then ducted by means of duct 732 to the aerospike rocket motor 780.

A second heat exchanger 731, which is driven by the expansion of liquid hydrogen that is pumped by means of pump 722, sub-cools the compressed intake air emanating from heat exchanger 730. The expanded liquid hydrogen is then ducted by means of duct 733 to the aerospike rocket motor 780.

In this latest form of the invention, liquid oxygen separator 740 separates liquid oxygen from the cryogenically chilled (expanded/saturated) intake air stream 703 emanating from the expansion turbine 720. Separation may be by centrifuge or other by other means well known to those skilled in the art. Separation may also be partially achieved in the expansion turbine 720.

In FIGS. 7 and 7A of the drawings, numeral 732 identifies the oxygen conduit to the rocket motor, numeral 733 identifies the hydrogen conduit to rocket motor, numeral 740 identifies the Liquid oxygen separator of this latest form of the invention, numeral 750 identifies the separated nitrogen conduit leading to the nosecone 701 and numeral 751 identifies the superheated nitrogen. More particularly, in operation conduit 750 acts a funnel to duct the super-cool nitrogen emanating from separator 740 to the nosecone, organpipe and shroud heat exchangers 701, 702 and 706 respectively.

As indicated by the flow arrows in FIGS. 7 and 7A, organ pipes 702 allow the pre-cooled, ambient air 703 to enter the intake apertures and into plenums 704. From plenums 704 the air flows to turbo compressor 710, into heat exchanger 730 which pre-cool the compressed air emanating from compressors 710. From first heat exchanger 730 the air flows to second heat exchanger 731 which pre-cool the compressed air emanating from heat exchanger 730. From heat exchanger 731 the air flows into expansion turbine 720. As previously mentioned expansion turbine 720 serves the dual purpose of extracting energy from the compressed intake air 703 and super cooling the intake air into the cryogenic zone so as to facilitate separation of liquid oxygen from the ambient air. As best seen in FIG. 7, propellant pumps 721 and 722 are operably associated with expansion turbines 720. As previously discussed, pumps 721 function to draw liquid oxygen from both separators 740 as well as liquid oxygen tanks 760. As indicated in FIG. 7, pump 721 pumps the liquid oxygen through heat exchanger 730 where it is expanded while cooling the compressed intake air 703. The expanded oxygen is then ducted by means of ducts 732 to the aerospike engine 780. In a similar manner, pump 722 functions to draw liquid hydrogen from hydrogen tank 761 and then pump the liquid hydrogen through heat exchanger 731 where it is expanded while sub cooling the compressed intake air 703. As illustrated in FIG. 7, the expanded hydrogen is then ducted by means of ducts 733 to the aerospike engine 780.

Aerospike rocket motor 780, which propels the alternate embodiment of the aerospace plane, here comprises a truncated, adaptive expansion ramp 781, a hyper expansion ramp 782 and a plume 783. (Plume 783 denotes the expansion envelope of the aerospike engine 780). Although both the ramps are employed at takeoff and initial fly out, only the hyper expansion ramp 782 will be employed through the hypersonic and space sectors of the ascent regime. The adaptive aerospike engine is more fully described in U.S. Pat. No. 6,213,431 issued to the present inventor. Expansion ramp 781 is truncated for optimum for take-off. A shorter expansion ramp is required for takeoff and during the initial flight due to high atmospheric pressure that counterbalances expansion. The longer hyper expansion ramp 782 is required at higher altitudes and in space to facilitate complete expansion with low, or near zero ambient pressure (hence assuring kinetic efficacy at all times). Hyper expansion is more fully discussed in U.S. Pat. No. 6,213,431 issued to the present inventor. Due to the burning off of propellant truncated ramp 781 is shut down as Mach 10 is approached. In orbit hyper expansion ramp 782 will suffice as the propulsive element.

Figure 7B:
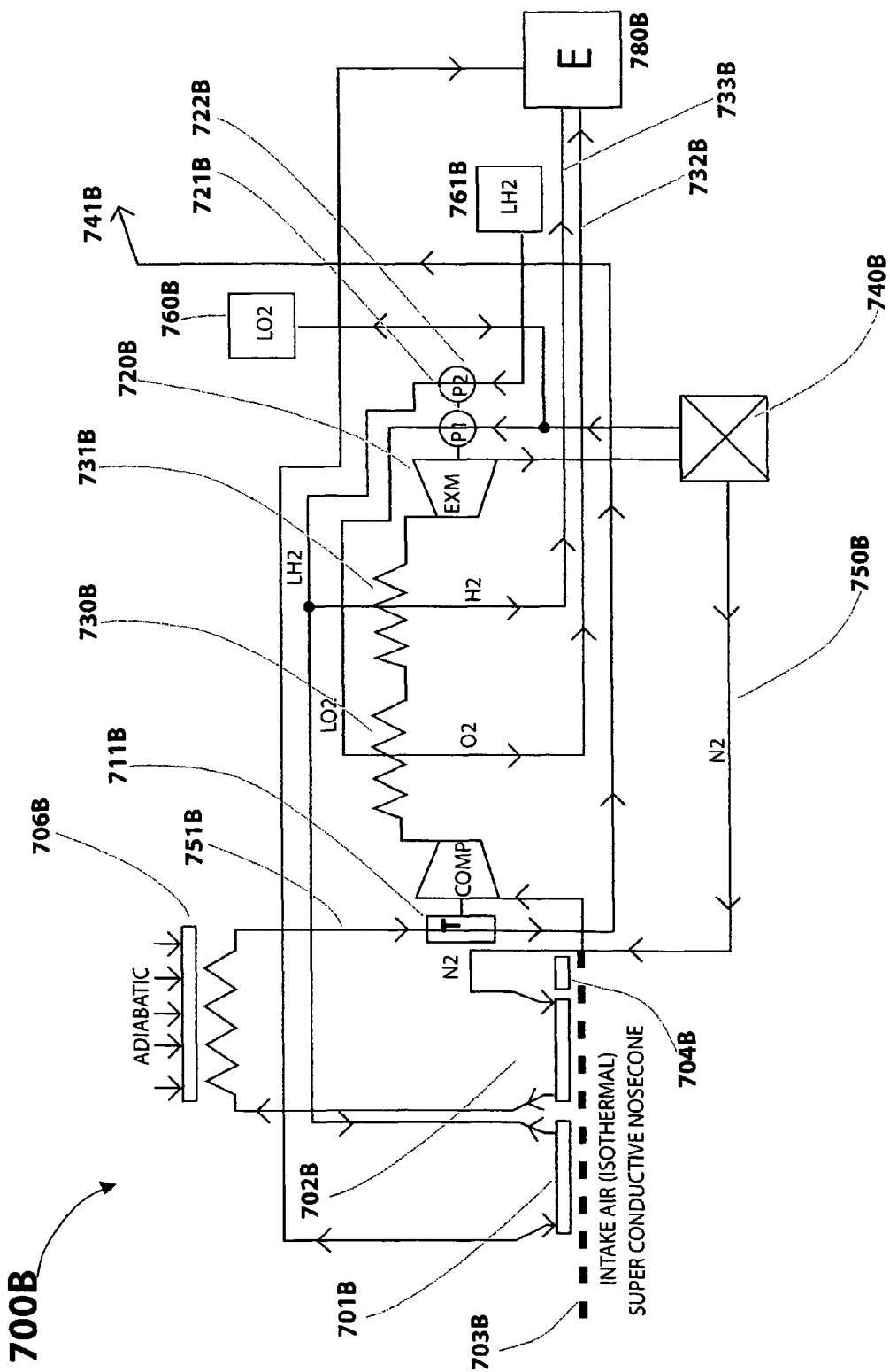
FIG. 7B is a generally schematic flow diagram illustrating the air flow through the various components of yet another form of the aerospace plane of the invention.
Figure 8:
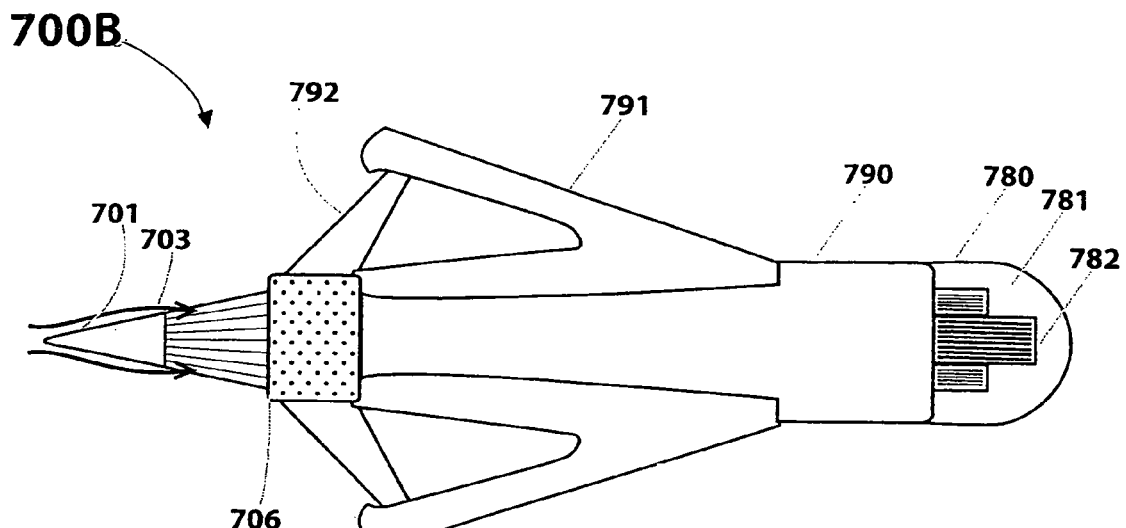
FIG. 8 is a top plan view of the aerospace plane illustrated in FIG. 7B.

Turning now to FIGS. 7B and 8 of the drawings, yet another embodiment of the reversible aerospace plane of the invention is there shown in generally designated by the numeral 700A. This latest embodiment of the invention is similar in many respects to the previously described embodiments and like numerals are used in FIGS. 7B and 8 to identify like components.

It is to be noted that in this latest embodiment of the invention, the super-cool nitrogen 750 will be heated by means of a heat exchanger, or superheat shroud 706 (FIG. 7B) to boost the available turbocharger power. Being outside the super-cool nosecone envelope, superheat shroud 706 is exposed to the full adiabatic compressive/heat impact of the shock front through the hypersonic regime. Accordingly, the nitrogen 751 emanating from heat exchanger 706 will be superheated to on the order of about 1,000 to about 1,500 F., thereby trebling, or quadrupling the compression power that may be recaptured in this way.

As before, turbine 711 may be configured either as a turbocharger, or alternatively may comprise an industry standard jet engine turbine spool. In this regard, it is to be noted that singular or multiple spools may be employed in parallel.

Liquid oxygen tank 760 of this latest form of the invention functions as a holding/storage device. In contradistinction to conventional practice, tanking of liquid oxygen will be limited to on the order of 60-80% (pending particularities) of the nominal sector requirement.

The superheat shroud 706 of this latest embodiment of the invention functions as a structural cooling means as well as superheat source to augment the performance of turbine 711 of the invention which is located directly downstream of the intake plenum 704 and of the organpipe tubes 702. The superheat shroud 706 may be finned, warped, dimpled, electroplated, etched or may be of a bimetallic construction.

It is to be observed that because super cooling is limited to the intake air 703 thru intake plenum 704, the superheat shroud 706 of the invention is subjected to the (free-flow) adiabatic shock front in excess of 2,000 deg Fahrenheit. As a consequence, as will be discussed in the paragraphs which follow, because of being ducted through shroud 706, the super cool nitrogen 750 will be heated to on the order of 1,500 deg Fahrenheit. Accordingly, the ultimate temperature of shroud 706 will be limited to on the order of 1,000 to 1,500 deg Fahrenheit.

As previously mentioned, the nosecone 701 is configured to act both as a shock cone and heat exchanger and, as in the earlier embodiments of the invention, is controllably chilled. Chilling of the nosecone is intended to protect the aerospace plane from the searing hypersonic compression heat, to mitigate the shock impact by morphing a lower mach number by means of super chilling and pre-cooling the ambient/intake air as an initial step to liquefaction. Chilling the ambient air forcefully will "shock" the compression of the ambient/intake air 703 over the nose cone into (cool) isothermal in lieu of (hot) adiabatic compression. It is also to be observed that at a compression ratio of 5 times the heat emanating from a chilled shock front would be approximately half that with adiabatic compression. At a compression ratio of 10 times the heat of compression from a chilled shock front would be 8.5 times less. At a compression ratio of 20× the heat of compression of a (super) chilled shock front would be 37 times less compared to adiabatic compression. It is to be noted that the previously identified organpipe constitutes a continuation of the nosecone cooling process. More particularly, the organpipe tubes are cooled in conjunction with nosecone 701 by means of the super-cool nitrogen 750 emanating from separator 740. As previously mentioned, liquid oxygen separator 740 separates liquid oxygen from the cryogenically chilled air stream 703 emanating from the expansion turbine 720.

Referring now to FIG. 8 of the drawings, the top plan view of the reversible aerospace plane of FIG. 7B is there shown. In this figure drawing, the para (reentry) and hyperfoil (ascending) wing sections are identified as 791 and 792, respectively. As before, numerals 780, 781 and 782 respectively identify the aerospike engine, the truncated, adaptive expansion ramp and the hyper expansion ramp.

Thus Referring to Tables 1 and 2 which follow, a comparison is there made between takeoff mass with and without oxygen liquefaction. With regard to Table 1 is to be observed that liquefaction mitigates the takeoff weight of the reversible aerospace plane to place a total of 80,000 lb in low earth orbit (for example, 25 ft/sec velocity). Conversely, the takeoff weight without liquefaction would be on the order of 562,118 lb in accordance with the computational example set forth in Table 2. Given that 88% of 562,118 lb would have been attributed to liquid oxygen (for example, 494,664 lb) in the nominal arrangement, liquefaction would attribute to (562,118−413,521)/494,664=30% savings in tanked liquid oxygen.

TABLE 1

| Vu | Ep | Prr | Ag | Gg | Mu |
|---|---|---|---|---|---|
| 25000 | 0.99 | 9 | 2.6 | 2.5 | 80000 |
| 24000 | 0.99 | 9 | 2.5 | 4.9 | 93408 |
| 23000 | 0.99 | 9 | 2.4 | 7.3 | 108328 |
| 22000 | 0.99 | 9 | 2.3 | 9.5 | 124788 |

TABLE 1-continued

| Vu | Ep | Prr | Ag | Gg | Mu |
|---|---|---|---|---|---|
| 21000 | 0.99 | 9 | 2.2 | 11.6 | 142791 |
| 20000 | 0.99 | 9 | 2.1 | 13.6 | 162307 |
| 19000 | 0.99 | 9 | 2 | 15.5 | 183274 |
| 18000 | 0.99 | 9 | 1.9 | 17.3 | 205592 |
| 17000 | 0.99 | 9 | 1.8 | 19.0 | 229125 |
| 16000 | 0.99 | 9 | 1.7 | 20.6 | 253697 |
| 15000 | 0.99 | 9 | 1.6 | 22.1 | 279095 |
| 14000 | 0.99 | 8 | 1.5 | 23.5 | 305070 |
| 13000 | 0.99 | 7 | 1.4 | 24.8 | 328202 |
| 12000 | 0.98 | 6 | 1.3 | 26.0 | 348083 |
| 11000 | 0.98 | 5 | 1.2 | 27.0 | 364678 |
| 10000 | 0.98 | 4 | 1.1 | 28.0 | 377759 |
| 9000 | 0.98 | 3 | 1 | 28.9 | 387472 |
| 8000 | 0.98 | 2 | 0.9 | 29.7 | 394103 |
| 7000 | 0.95 | 2 | 0.8 | 30.3 | 398043 |
| 6000 | 0.95 | 2 | 0.7 | 30.9 | 401598 |
| 5000 | 0.95 | 2 | 0.6 | 31.4 | 404630 |
| 4000 | 0.9 | 2 | 0.5 | 31.7 | 407128 |
| 3000 | 0.8 | 2 | 0.4 | 32.0 | 409192 |
| 2000 | 0.7 | 3 | 0.3 | 32.1 | 410861 |
| 1000 | 0.6 | 4 | 0.2 | 32.2 | 412593 |
| 0 | 0.5 | 9 | 0.1 | 32.2 | 413521 |

TABLE 2

| Vu | Ep | Prr | Ag | Gg | Mu |
|---|---|---|---|---|---|
| 25000 | 0.99 | 9 | 2.6 | 2.5 | 80000 |
| 24000 | 0.99 | 9 | 2.5 | 4.9 | 93408 |
| 23000 | 0.99 | 9 | 2.4 | 7.3 | 108328 |
| 22000 | 0.99 | 9 | 2.3 | 9.5 | 124788 |
| 21000 | 0.99 | 9 | 2.2 | 11.6 | 142791 |
| 20000 | 0.99 | 9 | 2.1 | 13.6 | 162307 |
| 19000 | 0.99 | 9 | 2 | 15.5 | 183274 |
| 18000 | 0.99 | 9 | 1.9 | 17.3 | 205592 |
| 17000 | 0.99 | 9 | 1.8 | 19.0 | 229125 |
| 16000 | 0.99 | 9 | 1.7 | 20.6 | 253697 |
| 15000 | 0.99 | 9 | 1.6 | 22.1 | 279095 |
| 14000 | 0.99 | 9 | 1.5 | 23.5 | 305070 |
| 13000 | 0.99 | 9 | 1.4 | 24.8 | 331339 |
| 12000 | 0.98 | 9 | 1.3 | 26.0 | 357593 |
| 11000 | 0.98 | 9 | 1.2 | 27.0 | 383784 |
| 10000 | 0.98 | 9 | 1.1 | 28.0 | 409289 |
| 9000 | 0.98 | 9 | 1 | 28.9 | 433748 |
| 8000 | 0.98 | 9 | 0.9 | 29.7 | 456799 |
| 7000 | 0.95 | 9 | 0.8 | 30.3 | 478090 |
| 6000 | 0.95 | 9 | 0.7 | 30.9 | 497919 |
| 5000 | 0.95 | 9 | 0.6 | 31.4 | 515289 |
| 4000 | 0.9 | 9 | 0.5 | 31.7 | 529912 |
| 3000 | 0.8 | 9 | 0.4 | 32.0 | 542206 |
| 2000 | 0.7 | 9 | 0.3 | 32.1 | 552284 |
| 1000 | 0.6 | 9 | 0.2 | 32.2 | 559310 |
| 0 | 0.5 | 9 | 0.1 | 32.2 | 562118 |

Figure 9:
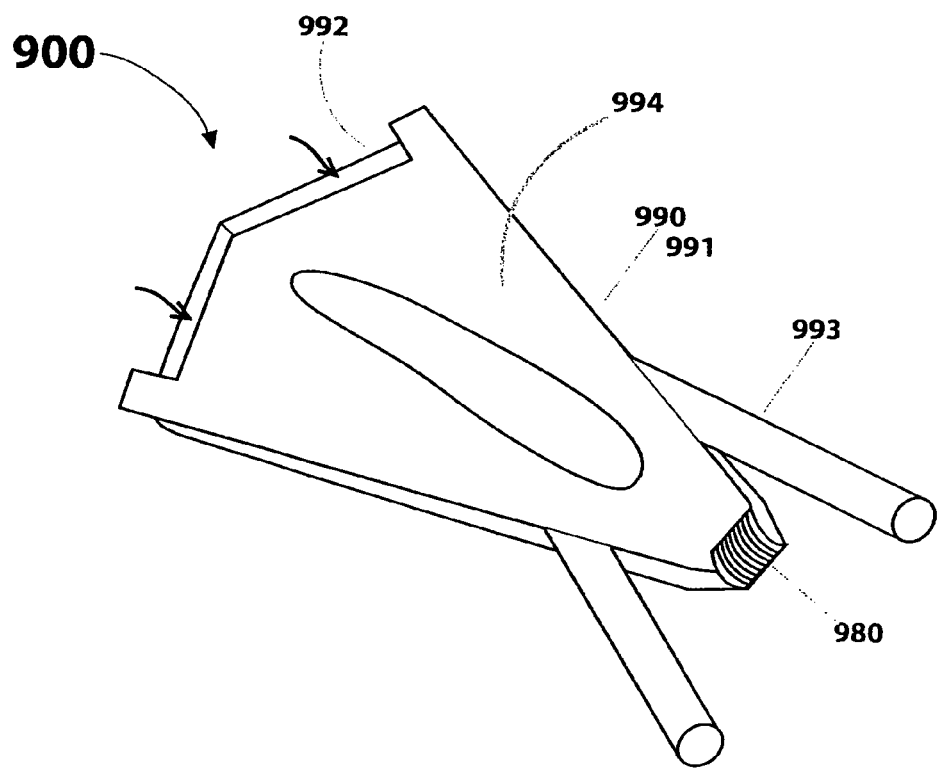
FIG. 9 is a generally perspective view of still another alternate form of aerospace plane of the invention.

Turning next to FIG. 9, an alternate (two dimensional) form of aerospace plane of the invention in a parafoil reentry format is there illustrated and generally designated as 990. This latest embodiment comprises a hyperfoil profiled intake 992 that is configured in accordance with the three dimensional nosecone format. An optional booster rocket 993 is provided for takeoff. Also provided is a cargo bay, or hydrogen tankage space that is here identified by the numeral 994. An aerospike rocket engine that can also serve as a reentry heat shield is identified by the numeral 980.

While the invention has been described with respect to a limited number of embodiments, those skilled in the art, having benefit of this disclosure, will appreciate that other embodiments can be devised which do not depart from the scope of the invention as disclosed herein.

I claim:

1. A reversible aerospace plane, comprising:
an air intake at a first end of the aerospace plane;
a compressor next to the first end of the aerospace plane for compressing the intake air;
a turbine disposed next to the compressor for driving said compressor;
a first heat exchanger disposed in the aerospace plane for cooling the compressed intake air to produce cooled compressed intake air;
a second heat exchanger disposed in the aerospace plane for cooling the cooled compressed intake air;
an engine at a second end of the aerospace plane, wherein the aerospace plane is configured to accelerate in a first orientation and configured to glide and land in a second orientation, wherein the second orientation is substantially a reverse of the first orientation;
a superheat shroud operably associated with said turbine for augmenting the performance of said turbine;
wherein one of said first and second heat exchangers is configured to use tanked liquid hydrogen as a coolant to condense at least a portion of an oxygen component of an incident air.

2. A reversible aerospace plane, comprising:
an air intake at a first end of the aerospace plane;
a compressor located next to the first end of the aerospace plane for compressing the intake air;
a turbine located next to the said compressor for driving said compressor;
a first heat exchanger disposed in the aerospace plane for cooling the compressed intake air to produce cooled compressed intake air;
a second heat exchanger disposed in the aerospace plane for cooling the cooled compressed intake air;
an expansion turbine operably associated with said second heat exchanger for super-cooling said intake air;
a superheat shroud operably associated with said turbine for augmenting the performance of said turbine;
and an engine at a second end of the aerospace plane, wherein the aerospace plane is configured to accelerate in a first orientation and configured to glide and land in a second orientation, wherein the second orientation is substantially a reverse of the first orientation;
wherein one of said first and second heat exchangers is configured to use tanked liquid hydrogen as a coolant to condense at least a portion of an oxygen component of an intake air.

3. The reversible aerospace plane as defined in claim 2, further comprising a nose cone at the first end of the aerospace plane, said nose cone being configured to be jettisoned before a re-entry.

4. The reversible aerospace plane of claim 2, wherein the engine comprises a bell nozzle engine configured to be jettisoned before a re-entry.

5. The reversible aerospace plane of claim 2, wherein the engine comprises an aerospike engine.

* * * * *